Patented Feb. 15, 1949

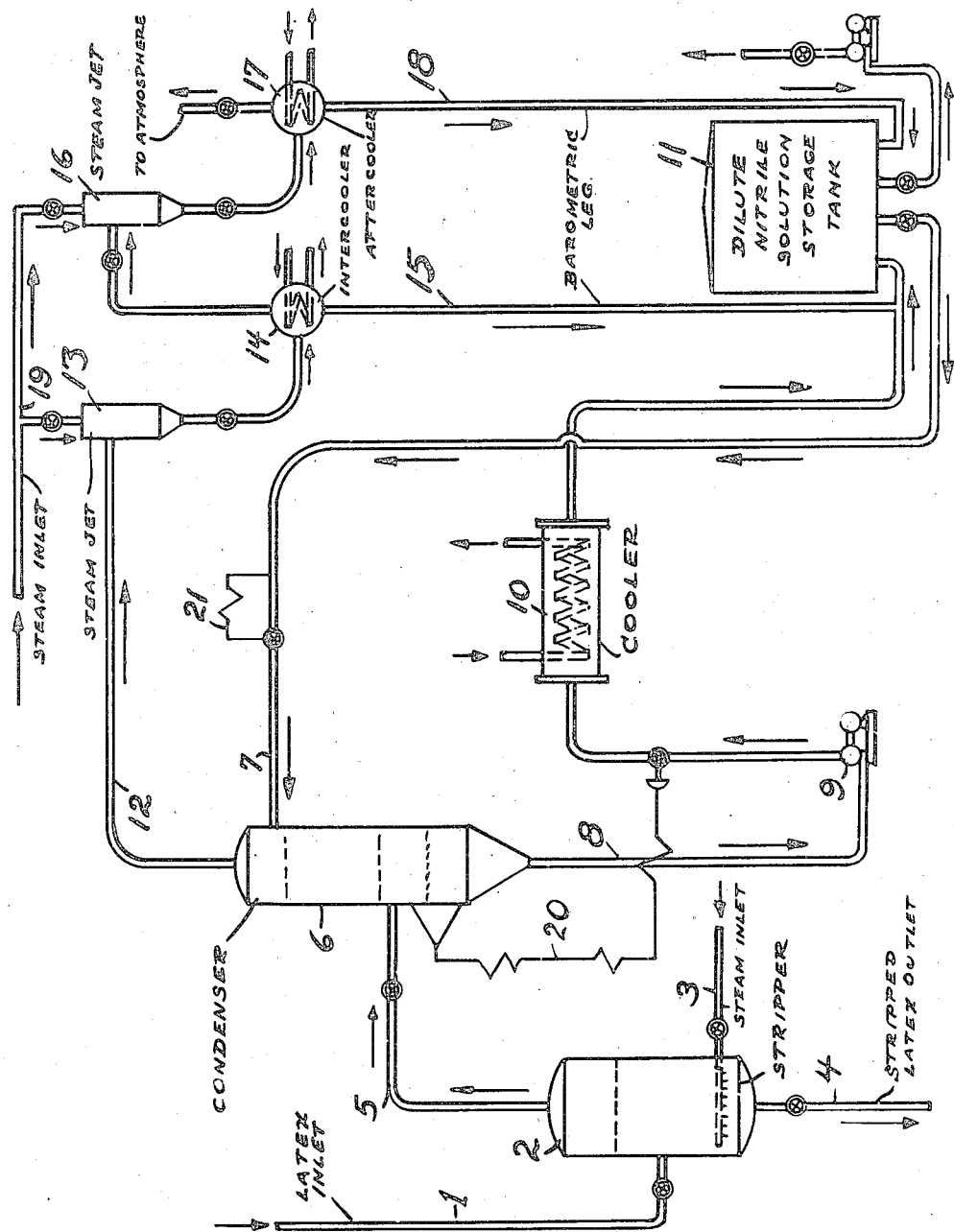

2,462,013

UNITED STATES PATENT OFFICE 2,462,013

STRIPPING OF EMULSION POLYMERIZATION LATICES

Wendell W. Waterman, Cranford, N. J., assignor to Standard Oil Development Company, a corporation of Delaware Application November 7, 1942, Serial No. 464,863

9 Claims. (Cl. 202—46)

The present invention pertains to the preparation of synthetic rubber-like materials by an emulsion polymerization process.

More particularly my invention pertains to the recovery of unreacted monomeric materials from emulsion polymerization reaction mixtures.

Synthetic rubber-like materials have been prepared for some time by the polymerization of a diolefin, such as butadiene, isoprene, piperylene and the like with a nitrile of a low molecular unsaturated organic acid, such as acrylic acid nitrile, methacrylic acid nitrile, etc., or with unsaturated ketones and esters such as methyl vinyl ketone, vinyl acrylate and vinyl methacrylate in aqueous emulsion. In this process the reactants, for example, butadiene and acrylonitrile, are emulsified in water and subjected to the action of a suitable emulsifier, such as a high molecular weight sulfated alcohol or a water soluble soap, such as sodium oleate or sodium stearate, together with a suitable catalyst such as hydrogen peroxide, benzoyl peroxide, sodium perborate or potassium persulfate for a period of from 4 to 20 hours under controlled conditions of temperature and pressure. This results in the formation of a latex of the synthetic rubber, containing, however, some unreacted butadiene and acrylonitrile. The unreacted butadiene may be recovered by flashing the latex down to atmospheric pressure or even applying vacuum to the latex at ordinary temperatures. The latex from this operation contains substantially all the unreacted acrylonitrile which is conveniently recovered by stripping the latex with steam. However, experience has indicated that steam stripping at atmospheric pressure results in a stripping temperature so high that in many cases appreciable degradation of the product occurs. For this reason it has been found advisable in such cases to carry out this operation under partial vacuum in order to lower the stripping temperature. In general it is preferred to operate at temperatures below 150° F., particularly satisfactory results having been obtained in the range from 100° F. to 140° F.

However, a major difficulty in stripping in this temperature range is encountered in many cases due to the fact that at a given pressure the vapors taken overhead from the stripper have a condensing temperature much lower than the stripping temperature. This effect may be more or less quantitatively explained on the basis of the miscibility characteristics of water and the reactant to be removed by stripping. For example, although dilute solutions of acrylonitrile in water or water in acrylonitrile may be formed, nevertheless at the temperatures employed for stripping the components are immiscible over a fairly wide range of composition. The aqueous phase of the latex is normally low enough in acrylonitrile content to be within the miscible range. However, as is frequently the case in systems of limited miscibility the solute, acrylonitrile, exhibits an abnormally high partial pressure over the solution so that the vapors taken overhead from the stripper during the first part of the stripping operation are so high in acrylonitrile content that condensation to two phases occurs. Since in the two-phase region each component exerts approximately its own vapor pressure at the condensing temperature, the condensing pressure, assuming a temperature equal to that in the stripper, would be considerably higher than the stripper pressure or conversely for a given pressure in both the stripper and condenser, the condensing temperature is considerably lower than the stripping temperature.

When the stripping operation is carried out batch-wise, the acrylonitrile content of the vapors decreases as nitrile is exhausted from the latex so that eventually a set of compositions is reached at which condensation to a single phase occurs. Another result of this change in composition is that the stripping temperature tends to rise during the operation approaching the boiling point of water at the operating pressure under final conditions. The point at which single phase condensation begins is usually found to represent a composition near the point at which it becomes uneconomical to recover further nitrile so that for the most part the operation is carried out with two-phase condensation. As an example, it is found that if the batch stripping operation is carried out at 144 mm. Hg absolute pressure, representing stripping temperatures in the range 120° F. to 138° F., the condensing temperature for the two-phase acrylonitrile-water binary mixture is in the neighborhood of 84° F. In many cases available cooling water temperatures range from 75° F. to 90° F., a range in which this condensation could either not be carried out at all or could be carried out only with an extremely large amount of heat exchange surface and high cooling water requirement. When the stripping is carried out continuously as for example in a stripping column, as disclosed in a copending application by Ohsol and Waterman or in a multiple stage stripping system as disclosed in a copending application by Green and Ohsol, it is usually necessary to carry out the two phase condensation as a continuous operation.

It is the object of the present invention to provide the art with a process of recovering unreacted materials having limited miscibility with water from emulsion polymerization reaction mixtures which overcomes these difficulties.

It is also the object of the present invention to provide the art with a method of recovering unreacted materials having limited miscibility with water from emulsion polymerization reaction mixtures by a process involving direct condensation of the vapors.

I have found that the recovery of unreacted materials having limited miscibility with water such as acrylic acid nitrile, methacrylic acid nitrile and unsaturated ketones or unsaturated esters such as methyl vinyl ketone or vinyl acrylate or vinyl methacrylate may be advantageously effected by a process involving directly contacting vapors containing an unreacted material of the type mentioned above with water or preferably with a dilute aqueous solution of said material under such conditions of pressure and temperature that substantially all of the vapors are condensed and recovered.

An apparatus suitable for carrying out my process is illustrated diagrammatically in the accompanying drawing. For the sake of simplicity it will be assumed that the process is applied to the stripping of a butadiene-acrylonitrile copolymer latex.

In the drawing, 1 is a line for supplying latex, from which the butadiene has been flashed off, to the stripper 2. Steam for stripping the acrylonitrile from the latex is supplied through line 3 and a suitable distributor at the bottom of the stripper. 4 is an outlet pipe for the discharge of stripped latex from stripper 2. The vapors of steam and acrylonitrile are taken overhead from the stripper through line 5 and discharged into packed condensation tower 6. Water, or preferably a dilute nitrile solution, is supplied to the condensation tower from storage tank 11 through line 7 and passes over the filling materials provided in the tower to assure adequate contact of the vapors and condensing liquid. The condensing liquid is supplied to the tower at a sufficiently low temperature and in sufficient volume to condense the vapors taken from the stripper. The combined condensing liquid and the condensate is discharged from the tower through line 8 which is provided with a pump 9 for pumping the combined liquids up to atmospheric pressure and through cooler 10 and into dilute nitrile storage tank 11.

The stripper and the condensation tower are operated under vacuum which may be maintained, for example, by a two stage steam jet vacuum system equipped with an indirect intercooler and an indirect aftercooler. In this system line 12 connects the top of the condensation tower with the first-stage steam jet 13. The vapors discharged from steam jet 13 pass into the water cooled intercooler 14 wherein some of the vapors are condensed, the liquid product being discharged through barometric leg 15. The vapors are withdrawn from the intercooler 14 by the second-stage steam jet 16 which discharges into the aftercooler 17 wherein the vapors are cooled by indirect contact with cooling water. The gaseous products, principally air leakage into the system, are discharged to the atmosphere while any liquid condensate is discharged through barometric leg 18. The condensate from the intercooler 14 and the aftercooler 17 contains any nitrile and water vapor that is removed from the condensation tower through line 12. This condensate is discharged from the barometric legs 15 and 18, respectively, into the dilute nitrile storage tank, the lines entering the bottom of the tank so as to provide a seal for the barometric legs. Steam for the operation of jets 13 and 16 is supplied through line 19. Dilute nitrile solution is withdrawn from the storage tank and pumped to a suitable concentrator or, if desired, directly to a reactor for reuse. It is to be understood that the apparatus shown in the drawing is intended to be illustrative and that many changes or additions may be made thereto within the purview of the present invention. For example, a liquid level controller 20 may be provided to maintain the liquid level in the condensation tower between certain points as shown in the drawing. A similar controller may also be provided to maintain a desired liquid level in the dilute nitrile storage tank. If desired, a flow controller 21 or a flow meter may be utilized to maintain a steady liquid circulation rate through the condenser.

The operation of my process will appear more clearly from the following example.

A latex, obtainable by polymerizing 74 parts of butadiene and 26 parts of acrylonitrile in about 200 parts of water using about 10 parts of sodium oleate as emulsifier and about 5 parts of potassium persulfate as catalyst and stripping off unreacted butadiene, is introduced into the stripping vessel. Steam at about 20 lbs. per square inch ga. and at 260° F. is introduced into the stripper. The pressure in the stripping vessel is maintained at about 144 mm. of mercury absolute by means of the steam jets. The initial stripping temperature is in the neighborhood of 120° F., this temperature tending to rise during the operation to about 138° F.

A dilute nitrile solution, containing about 1 mol per cent of acrylonitrile, is withdrawn from the storage tank at approximately 95° F. and is circulated through the condensation tower, the exit temperature of the liquid being about 113° F. The liquid withdrawn from the condensation tower is pumped up to atmospheric pressure and cooled from 113° F. to about 95° F. in the cooler 10, the cooling water temperature rising from 77° F. to 93° F. When the steam input to the stripper is 2500 lbs. per hour, the volume of dilute acrylonitrile solution circulated to maintain these temperatures is about 278 G.P.M. and the amount of heat exchange surface required for the cooler is approximately 1500 sq. feet. Approximately 310 G.P.M. of cooling water to the cooler are required. The volume of acrylonitrile solution supplied to the condensation tower is sufficient to dilute the condensate to such a point that the total acrylonitrile brought in with the vapors and in the condensing liquid will be soluble in the effluent from the condensation tower, thereby maintaining a single phase solution throughout the condensation and storage system.

It is advantageous to maintain the concentration of acrylonitrile in the dilute nitrile stream in the neighborhood of 1 mol per cent since the total quantity of water present in a solution of this concentration (assuming the quantity of unreacted acrylonitrile to correspond to a conversion in the reaction step of about 75%) is substantially that required for making up the emulsion of reactants prior to carrying out the polymerization reaction. Consequently, the solution can be recycled directly to the polymerization process without concentration of the acrylonitrile.

The process of my invention has the advantage that the condensation of the vapors from the stripper can be carried out at a pressure corresponding to an advantageous stripping temperature under such conditions that the latent heat of condensation may be removed from the system at a substantially higher temperature level, i. e., about 104° F., than might otherwise be employed. For example, if indirect condensation is used, the temperature level required for condensation of the stripped vapors would be 84° F., a temperature that could not be attained by the use of ordinary cooling water having a temperature within the range of from 75° F. to 90° F. My process has the further advantage that the operations and equipment required are more economical than alternative methods such as refrigeration of the cooling water to a direct condenser or mechanical compression of the vapors between the stripper and condenser.

My process of stripping unreacted nitriles is applicable to emulsion polymerization reaction mixtures comprising nitriles of the general formula

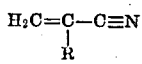

wherein R stands for hydrogen or a lower alkyl group such as methyl, ethyl, propyl or the like and particularly to polymerization reaction mixtures wherein from about 15-50% of one of the aforesaid nitriles is copolymerized with from about 85 to 50% of a diolefin such as butadiene, isoprene, piperylene or dimethylbutadiene. My process is also applicable to the stripping of other slightly water-soluble polymerizable materials such as unsaturated ketones or unsaturated esters such as methyl vinyl ketone, vinyl acrylate, vinyl methacrylate and the like. The preparation of the polymerization mixture forms no part of my invention and obviously may be carried out in any well known manner, in batch or continuous operation.

What I claim and desire to secure by Letters Patent is:

1. The process of stripping emulsion polymerization reaction mixtures of unreacted, slightly water-soluble, polymerizable materials which comprises subjecting the reaction mixture to steam distillation under reduced pressure and condensing the vapors evolved by direct contact with a condensing liquid comprising a dilute solution of said polymerizable material of such concentration that the total content of polymerizable material brought in with the stripping vapors and in the condensing liquid is soluble in the effluent from the condensing step.

2. The process of stripping emulsion polymerization reaction mixtures comprising a nitrile of the general formula

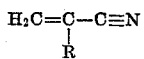

wherein R stands for a member of the group consisting of hydrogen and lower alkyl groups of unreacted nitrile which comprises subjecting the reaction mixture to steam distillation under reduced pressure, and condensing the vapors evolved by direct contact with a condensing liquid comprising a dilute nitrile solution.

3. The process of stripping emulsion polymerization reaction mixtures comprising a nitrile of the general formula

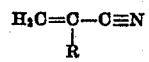

wherein R stands for a member of the group consisting of hydrogen and lower alkyl groups of unreacted nitrile which comprises subjecting the reaction mixture to steam distillation under reduced pressure, and condensing the vapors evolved by direct contact with a condensing liquid comprising a dilute nitrile solution of such concentration that the total nitrile content brought in with the stripping vapors and in the condensing liquid is soluble in the effluent from the condensing step.

4. The process of stripping unreacted nitrile from emulsion polymerization reaction mixtures comprising a nitrile of the formula

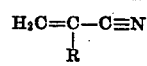

wherein R stands for a member of the group consisting of hydrogen and lower alkyl groups and a diolefin which comprises subjecting the latex after flashing off unreacted diolefin to a steam distillation under reduced pressure and condensing the vapors evolved by direct contact with a condensing liquid comprising a dilute nitrile solution.

5. The process of stripping unreacted nitrile from emulsion polymerization reaction mixtures comprising a nitrile of the formula

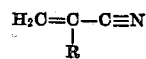

wherein R stands for a member of the group consisting of hydrogen and lower alkyl groups and a diolefin which comprises subjecting the latex after flashing off unreacted diolefin to a steam distillation under reduced pressure and condensing the vapors evolved by direct contact with a condensing liquid comprising a dilute nitrile solution of such concentration that the total nitrile content brought in with the stripping vapors and in the condensing liquid is soluble in the effluent from the condensing step.

6. The process of stripping unreacted acrylonitrile from a latex obtained by emulsion copolymerization of acrylonitrile and a butadiene hydrocarbon which comprises subjecting the latex, after flashing off unreacted butadiene hydrocarbon, to steam distillation under reduced pressure and condensing the vapors evolved by direct contact with a condensing liquid comprising a dilute nitrile solution.

7. The process of stripping unreacted acrylonitrile from a latex obtained by emulsion copolymerization of acrylonitrile and a butadiene hydrocarbon which comprises subjecting the latex, after flashing off unreacted butadiene hydrocarbon, to steam distillation under reduced pressure and condensing the vapors evolved by direct contact with a condensing liquid comprising a dilute nitrile solution of such concentration that the total nitrile content brought in with the stripping vapors and in the condensing liquid is soluble in the effluent from the condensing step.

8. The process of stripping emulsion polymerization reaction mixtures of unreacted slightly water-soluble polymerizable materials which comprises subjecting the reaction mixture to the action of a steam jet vacuum system, passing a heated vapor through the reaction mixture to strip the reaction mixture of unreacted slightly water-soluble polymerizable materials, condensing the vapors evolved by direct contact with a condensing liquid comprising a dilute solution of said polymerizable material of such concentration that the total content of polymerizable material brought in with the stripping vapors and in the condensing liquid is soluble in the effluent from the condensing step, condensing the vapors from the steam jet vacuum system and combining the condensate thus obtained with the first-named condensate.

9. The process of stripping unreacted acrylonitrile from a latex obtained by emulsion copolymerization of acrylonitrile and butadiene-1,3 to the action of a steam jet vacuum system, passing steam through the latex to strip off unreacted acrylonitrile, condensing the vapors evolved by direct contact with a dilute acrylonitrile solution, condensing the vapors from the steam jet vacuum system and combining the condensate thus obtained with the first-named condensate.

WENDELL W. WATERMAN.

REFERENCES CITED

The following references are of record in the file of this patent:

UNITED STATES PATENTS

| Number | Name | Date |
|---|---|---|
| 992,325 | Yaryan | May 16, 1911 |
| 2,224,925 | Potts et al. | Dec. 17, 1940 |
| 2,259,180 | Schaenfeld et al. | Oct. 14, 1941 |
| 2,290,373 | Lee | July 21, 1942 |
| 2,297,004 | Lee | Sept. 29, 1942 |
| 2,350,584 | Buell et al. | June 6, 1944 |